(12) United States Patent
Nagase

(10) Patent No.: US 7,382,920 B2
(45) Date of Patent: Jun. 3, 2008

(54) ANALYZING APPARATUS, MODEL CREATING METHOD, AND COMPUTER PRODUCT

(75) Inventor: Kenji Nagase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 45 days.

(21) Appl. No.: 11/604,360

(22) Filed: Nov. 27, 2006

(65) Prior Publication Data

US 2008/0007553 A1    Jan. 10, 2008

(30) Foreign Application Priority Data

Jul. 5, 2006    (JP)    ............... 2006-185480

(51) Int. Cl.
*G06K 9/34*    (2006.01)
(52) U.S. Cl. .................. 382/173; 382/192; 716/20
(58) Field of Classification Search ............... 382/100, 382/162, 173, 175, 181, 192; 716/20
See application file for complete search history.

(56) References Cited

U.S. PATENT DOCUMENTS 5,754,182 A * 5/1998 Kobayashi .................. 345/423
5,754,688 A * 5/1998 Gatlin et al. ................ 382/193
5,812,434 A * 9/1998 Nagase et al. .................. 703/2
5,898,793 A * 4/1999 Karron et al. ............... 382/131
5,936,869 A * 8/1999 Sakaguchi et al. ............. 703/1
5,946,479 A * 8/1999 Sakaguchi et al. ............ 716/20
2006/0284871 A1 * 12/2006 Kee et al. .................... 345/423

FOREIGN PATENT DOCUMENTS

| JP | 10-255077 | 9/1998 |
|---|---|---|
| JP | 11-025293 | 1/1999 |
| JP | 2000-340476 | 12/2000 |

* cited by examiner

*Primary Examiner*—Bravesh M. Mehta
*Assistant Examiner*—Anand Bhatnagar
(74) *Attorney, Agent, or Firm*—Staas & Halsey LLP

(57) ABSTRACT

A mesh is placed over an image of an element thereby dividing the image (element) into a plurality of solids. Each of the solids is then divided equally into the even number of parts. Inclusion-ratio determination-points, which are points where the straight lines and the mesh intercross, are decided. Moreover, it is determined whether the inclusion-ratio determination-points are inside or outside of the element. An analytical model for the element is created based on whether the inclusion-ratio determination-points are inside or outside of the element.

4 Claims, 9 Drawing Sheets

FIG.5
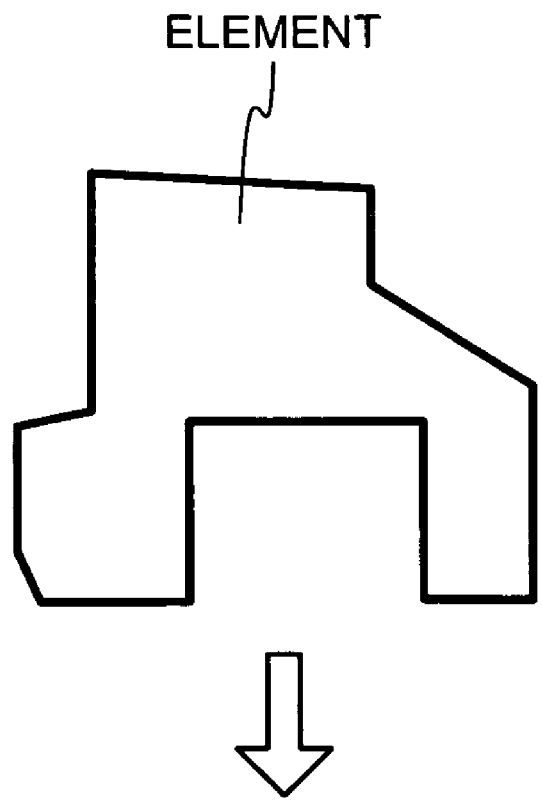
ELEMENT
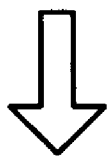
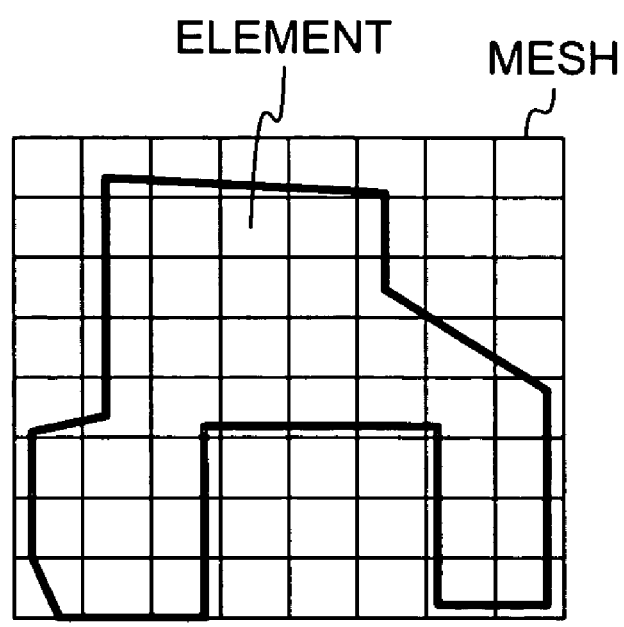
ELEMENT   MESH

INCLUSION-RATIO
DETERMINATION POINTS

INCLUSION-RATIO
DETERMINATION POINTS

FIG.10
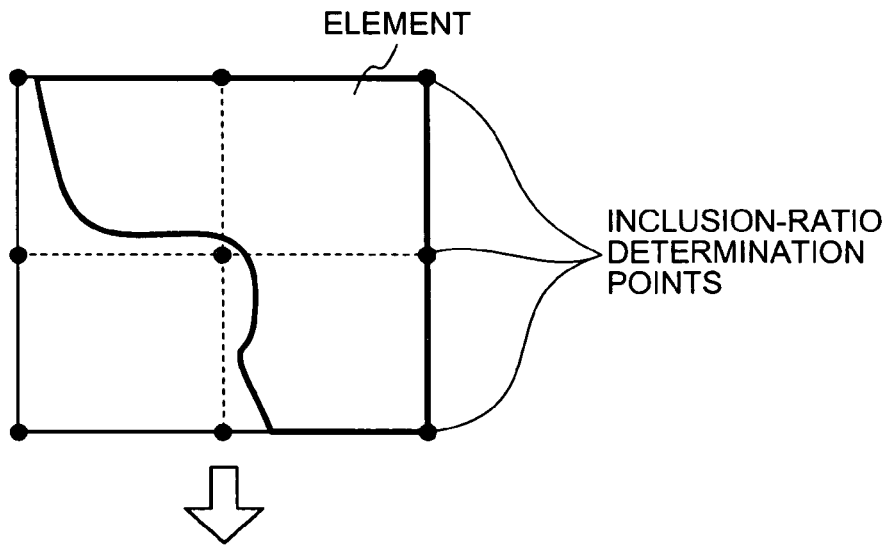
INCLUSION-RATIO DETERMINATION POINTS INSIDE ELEMENT: 4
TOTAL INCLUSION-RATIO DETERMINATION
POINTS: 9 (INCLUSION-RATIO
IS 4/9=44.4%) (THRESHOLD: 5
VALUES AROUND THRESHOLD: 4 TO 6)
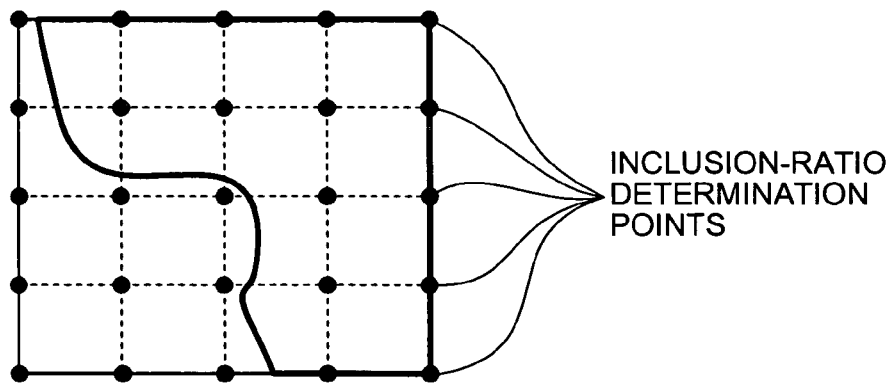
INCLUSION-RATIO DETERMINATION
POINTS INSIDE ELEMENT: 14
TOTAL INCLUSION-RATIO DETERMINATION
POINTS: 25 (INCLUSION-RATIO IS 14/25=56%)
(THRESHOLD: 13)

ANALYZING APPARATUS, MODEL CREATING METHOD, AND COMPUTER PRODUCT

BACKGROUND OF THE INVENTION

1. Field of the Invention

The present invention relates to generating an analytical model for analyzing an element.

2. Description of the Related Art

Various methods for analyzing an element are known. The analysis can be structural analysis, fluid analysis, electromagnetic wave analysis etc. One of such methods includes placing a mesh over the element thereby dividing the element into a plurality of solids, and allocating information to each of the solids indicative of whether the element exists in the solids thereby creating an analytical model of the element. The element is then analyzed using the analytical model.

A conventional art is disclosed in Japanese Patent Application Laid-open No. 1998-255077. The disclosed technique includes calculating a ratio of the volume of the element in each solid, and checking if the ratio of the volume of the element in a solid is equal to or more than a predetermined threshold (e.g., 50%). If the ratio is equal to or more than the threshold (e.g., 50%), information indicative of presence of the element is allocated to the solid, otherwise information indicative of absence of the element is allocated to the solid.

The conventional art includes calculating the volume of the element in the solids one by one and then calculating the ratio of the volume of the element to the volume of the entire solids. Therefore, the conventional art had a problem that the calculation takes a long time.

Thus, there is a need of a technology that can calculate an analytical model in a short time.

SUMMARY OF THE INVENTION

It is an object of the present invention to at least partially solve the problems in the conventional technology.

According to an aspect of the present invention, an analyzing apparatus includes a placing unit that places a mesh over an image of the element thereby dividing the image into a plurality of solids; a dividing unit that divides with straight lines each of the solids into an even number of parts, each part having substantially same area; a determining unit that for each of the solids determines intersection points that are points where the straight lines in the solid intersect with a boundary of the element in the image; a calculating unit that determines for each of the solids whether the intersection points determined by the determining unit are inside or outside of the element, and calculates a number of inside intersection points that are intersection points inside of the element; and a model creating unit that determines for each of the solids whether the number of the inside intersection points calculated by the calculating unit is equal to or more than a first threshold, allocates information indicative of presence of the element in a solid determined to have the number of the inside intersection points equal to or more than the first threshold, allocates information indicative of absence of the element in a solid determined to have the number of the inside intersection points less than the first threshold, and creates an analytical model for the element from the information allocated to the solids.

According to another aspect of the present invention, a method of creating an analytical model for analyzing an element includes placing a mesh over an image of the element thereby dividing the image into a plurality of solids; dividing with straight lines each of the solids into an even number of parts, each part having substantially same area; determining, for each of the solids, intersection points that are points where the straight lines in the solid intersect with a boundary of the element in the image; determining, for each of the solids, whether the intersection points are inside or outside of the element, and calculating a number of inside intersection points that are intersection points inside of the element; determining, for each of the solids, whether the number of the inside intersection points is equal to or more than a first threshold; allocating information indicative of presence of the element in a solid determined to have the number of the inside intersection points equal to or more than the first threshold; allocating information indicative of absence of the element in a solid determined to have the number of the inside intersection points less than the first threshold; and creating an analytical model for the element from the information allocated to the solids.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic for explaining a method of placing a mesh over an element;

FIG. 10 is a schematic for explaining an outline and salient features of an analyzing apparatus according to a second embodiment of the present invention.

DETAILED DESCRIPTION OF THE PREFERRED EMBODIMENTS

Exemplary embodiments of the present invention will now be described in reference to the accompanying drawings.

Figure 1:
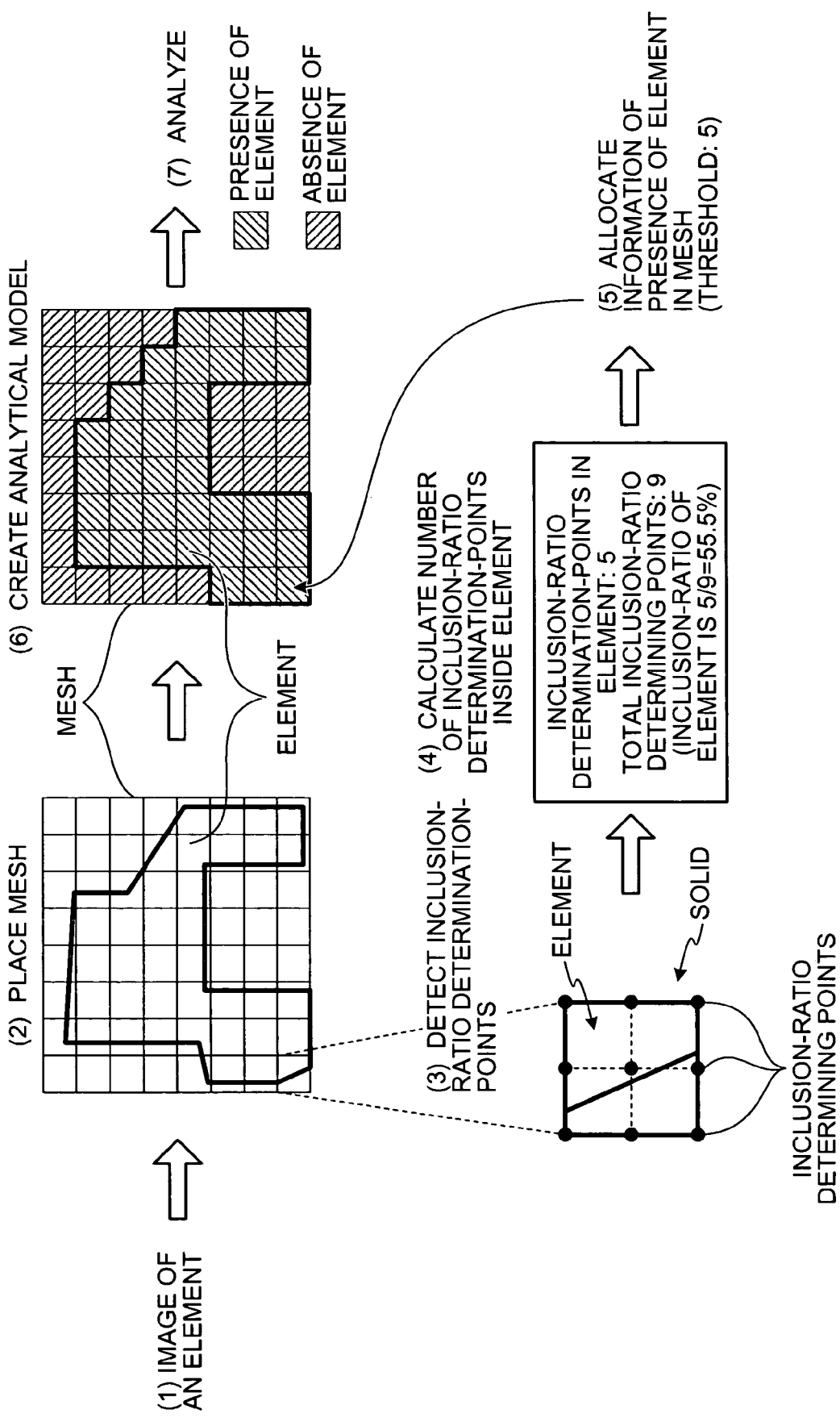
FIG. 1 is a schematic for explaining an outline and salient features of an analyzing apparatus according to a first embodiment of the present invention.

An outline and salient features of an analyzing apparatus of a first embodiment of the present invention will first be described with reference to FIG. 1. FIG. 1 is a schematic for explaining an outline and salient features of an analyzing apparatus 10 (see FIG. 2) of the first embodiment. In the following explanation, a two-dimensional analytical model is created from two-dimensional image information; however, the present invention is not limited to two dimensions. In other words, a three-dimensional analytical model can similarly be prepared from three-dimensional information.

In summary, the analyzing apparatus 10 of the first embodiment places a mesh over an element that is a subject for analysis to divide the element into a plurality of solids, allocates presence/absence information to each of the solids indicative of whether the element exists in the solids to create an analytical model, and analyzes the subject using the analytical model. The main feature of the analyzing apparatus 10 is that the analyzing apparatus 10 speeds up the analyzing process.

As shown in FIG. 1, when an image of an element (e.g., CAD data illustrating a form of an element) is input (see (1) of FIG. 1), the analyzing apparatus 10 places a mesh over the image thereby dividing the image into a plurality of solids (see (2) of FIG. 1). The analyzing apparatus 10 then divides each of the solids into the even number of equal parts with straight lines, and determines inclusion-ratio determination-points that are points where the straight lines and the mesh intersect (see (3) of FIG. 3). Specifically, in the example shown in (3) of FIG. 3, the analyzing apparatus 10 divides each of the solids into four equal parts with straight lines and determines that there are five inclusion-ratio determination-points.

The analyzing apparatus 10 then determines for each of the solids whether the inclusion-ratio determination-points are inside of the element or outside of the element and calculates numbers of the inclusion-ratio determination-points that are inside of the element (see (4) of FIG. 1). For example, in the example of FIG. 1, the analyzing apparatus 10 calculates that the number of inclusion-ratio determination-points that are inside the element is "5". Because the total number of inclusion-ratio determination-points is "9" and the number of the inclusion-ratio determination-points that are inside the element is "5", the ratio (hereinafter, "inclusion ratio") of the element in (3) of FIG. 1 is 5/9=55.5%.

Further, for each of the solids, the analyzing apparatus 10 determines whether the calculated number of the inclusion-ratio determination-points is equal to or more than a predetermined threshold (see (5) of FIG. 1). For a solid for which the number of the inclusion-ratio determination-points is more than the threshold, the analyzing apparatus 10 allocates information indicative of presence of the element to that solid. Otherwise, the analyzing apparatus 10 allocates information indicative of absence of the element to that solid. Furthermore, the analyzing apparatus 10 creates an analytical model (see (6) of FIG. 1) based on the information allocated to the solids. In the example of FIG. 1, the analyzing apparatus 10 determines that the number of the inclusion-ratio determination-points is "5" that is equal to or more than the predetermined threshold of "5", and allocates information indicative of presence of the element to the solid and creates an analytical model. The analyzing apparatus 10 then analyzes the subject using the analytical model (see (7) of FIG. 1).

In this manner, the analyzing apparatus 10 determines the number of the inclusion-ratio determination-points rather than the conventional method of calculating the area or the volume of the element. The process of determination of the number of the inclusion-ratio determination-points is easier and faster.

Figure 2:
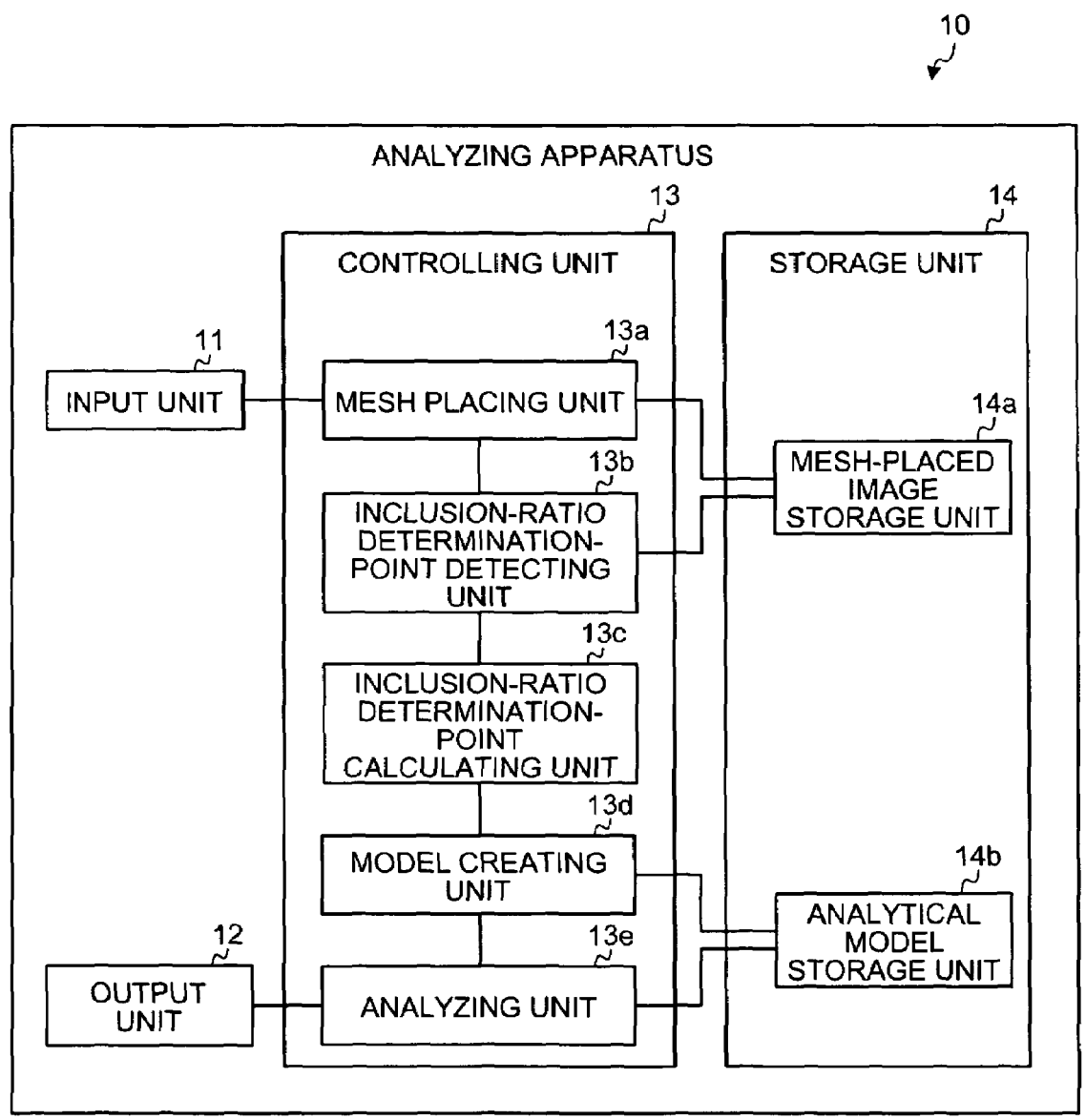
FIG. 2 is a block diagram of the analyzing apparatus according to the first embodiment.
Figure 3:
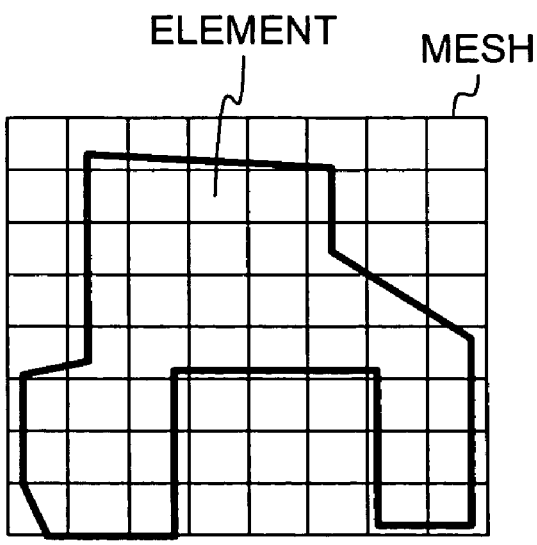
FIG. 3 depicts placing of a mesh on an element.
Figure 4:
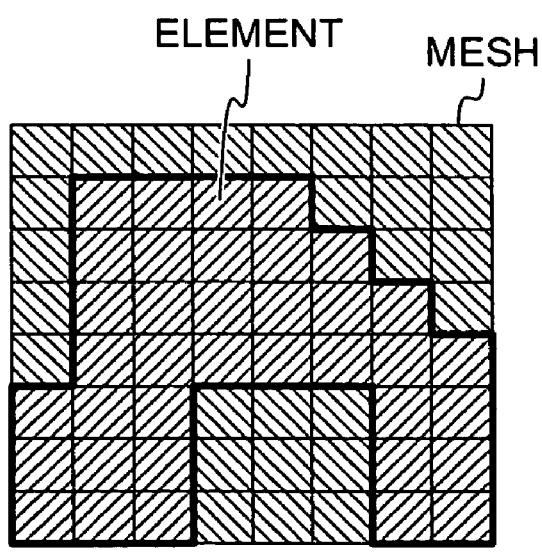
FIG. 4 depicts generation of an analytical model of the element.
Figure 6:
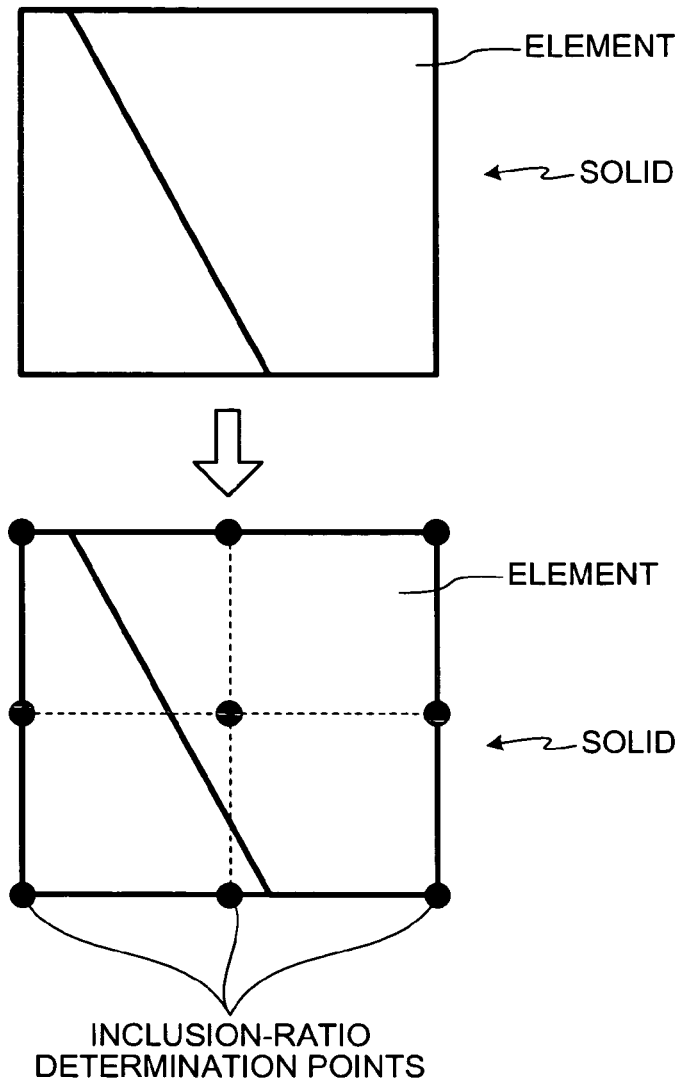
FIG. 6 is a schematic for explaining a method of detecting inclusion-ratio determination-points.
Figure 7:
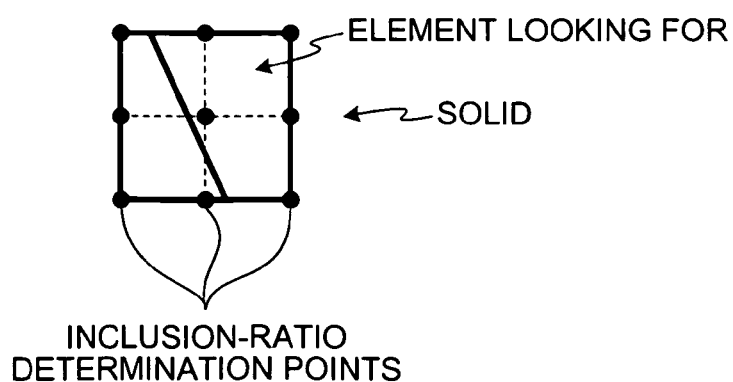
FIG. 7 is an explanatory view of a process that calculates a number of the inclusion-ratio determination-points at the position included in an element.
Figure 8A:
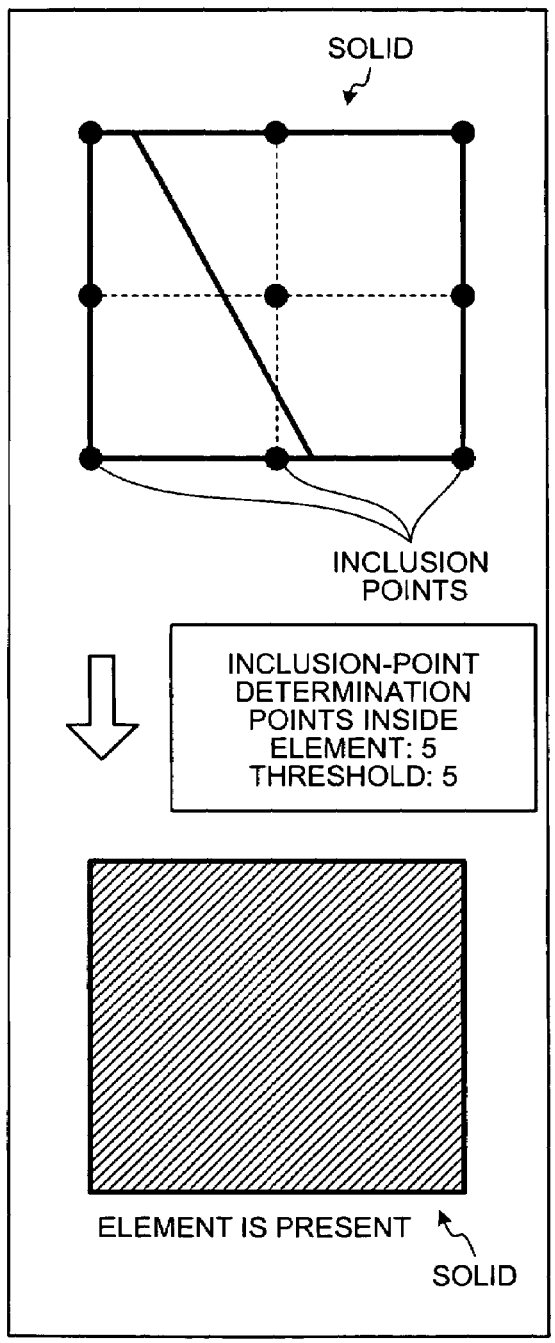
FIG. 8 is an explanatory view of a process that allocates presence/absence information to each solid.
Figure 8B:
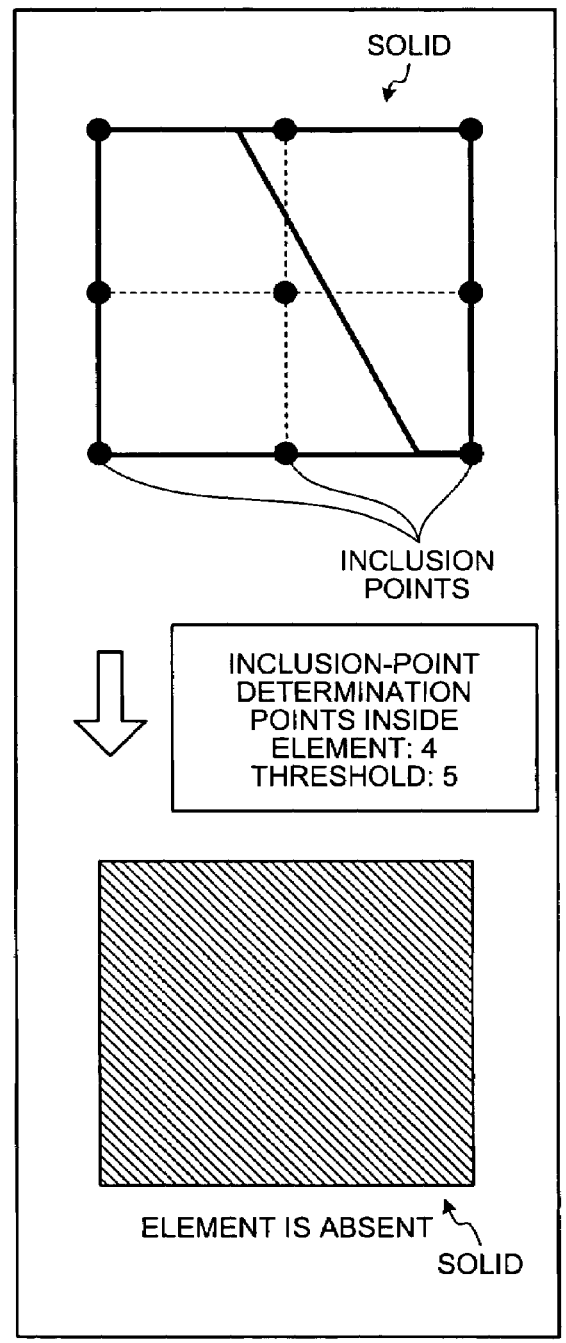

FIG. 2 is a detailed block diagram of the analyzing apparatus 10. FIG. 3 depicts a mesh placed image stored in a mesh-placed image storage unit. FIG. 4 depicts an analytical model stored in an analytical model storage unit. FIG. 5 is a schematic for explaining a method of placing a mesh over an element. FIG. 6 is a schematic for explaining a method of detecting inclusion-ratio determination-points. FIG. 7 is an explanatory view of a process that calculates a number of inclusion-ratio determination-points at the position included in the element. FIG. 8 is an explanatory view of a process that allocates presence/absence information to each solid.

As shown in FIG. 2, the analyzing apparatus 10 includes an input unit 11, an output unit 12, a controlling unit 13, and a storage unit 14.

The input unit 11 receives input of an element that is a subject for analysis and can be a keyboard, a mouse, a microphone, or the like. For example, as shown in FIG. 3, the input unit 11 receives input of an image of an element for analysis. The image can be a two dimensional image, a three dimensional image, CAD data, or the like. The output unit 12 displays the result of the analysis, and can be a display device, such as a CRT display or a touch panel, a speaker, or the like.

The storage unit 14 stores therein data and computer programs that are necessary when the controlling unit 13 performs various processes. Moreover, the storage unit 14 includes a mesh-placed image storage unit 14a and an analytical model storage unit 14b.

The mesh-placed image storage unit 14a stores therein image information of the element with a mesh placed by a mesh placing unit 13a. Specifically, the mesh-placed image storage unit 14a stores therein image information of the element placed with a mesh as shown in FIG. 3.

The analytical model storage unit 14b stores therein an analytical model created by a model creating unit 13d. Specifically, the analytical model storage unit 14b stores an analytical model created by allocating presence/absence information indicative of whether the element exists in the solids to each solid as shown in FIG. 4.

The controlling unit 13 includes an internal memory (not shown) to store computer programs providing various procedures and required data and conducts various processes with the programs and data. The controlling unit 13 includes the mesh placing unit 13a, an inclusion-ratio determination-point detecting unit 13b, an inclusion-ratio determination-point calculating unit 13c, the model creating unit 13d, and an analyzing unit 13e. The inclusion-ratio determination-point detecting unit 13b corresponds to a "determining unit", and the inclusion-ratio determination-point calculating unit 13c corresponds to a "calculating unit" in the claims.

The mesh placing unit 13a places a mesh over the image of the element and divides the image, i.e., the element, into a plurality of solids. The image with the mesh placed over it is stored in the mesh-placed image storage unit 14a. As shown in FIG. 5, the mesh placing unit 13a places a mesh having 64 nets (8 by 8), for example, over the image. As a result, the image is divided into solids depending on the size of the mesh.

The inclusion-ratio determination-point detecting unit 13b divides with straight lines each of the solids into even number of parts, and determines inclusion-ratio determination-points for each of the solids. Specifically, the inclusion-ratio determination-points detecting unit 13b reads image information recorded in the mesh-placed image storage unit 14a and applies straight lines diving the solids of the image information to detect inclusion-ratio determination-points where the straight lines and the mesh intercross.

As shown in FIG. 6, the inclusion-ratio determination-point detecting unit 13b applies straight lines dividing the solids of the image information into four and detects inclusion-ratio determination-points where the straight lines and the mesh intersect.

For each of a plurality of solids, the inclusion-ratio determination-point calculating unit 13c determines whether the detected inclusion-ratio determination-points are at the position included in the element and calculates the numbers of the inclusion-ratio determination-points at the position included in the element. Specifically, the inclusion-ratio determination-point calculating unit 13c determines whether the inclusion-ratio determination-points detected by the inclusion-ratio determination-point detecting unit 13b are at the position included in the element and calculates the numbers of the inclusion-ratio determination-points at the position included in the element.

A process that calculates a number of the inclusion-ratio determination-points at the position included in the element will then be described in detail with reference to FIG. 7. Specifically, as shown in FIG. 7, the inclusion-ratio determination-point calculating unit 13c calculates that the number of the inclusion-ratio determination-points at the position included in the element is "5". Since the number of the entire inclusion-ratio determination-points is "9" and the number of the inclusion-ratio determination-points at the position included in the element is "5", the ratio (inclusion ratio) of the element in the solid is 5/9=55.5%. Calculation of the inclusion ratio is not always necessary.

The model creating unit 13d allocates presence/absence information indicative of whether the element exists in the solid to every solid and creates an analytical model. Specifically, the model creating unit 13d determines for each of the plurality of solids whether the calculated numbers of the inclusion-ratio determination-points are more than a predetermined threshold, and allocates information indicative of presence of the element to the solids determined to have numbers of the inclusion-ratio determination-points equal to or more than the predetermined threshold, and allocates information indicative of absence of the element to the solids determined to have numbers of the inclusion-ratio determination-points less than the predetermined threshold.

The model creating unit 13d determines whether the presence/absence information is allocated to the entire solids, and repeats the allocation process of the presence/absence information when presence and absence of the element are not allocated to the entire solids. The model creating unit 13d creates an analytical model based on the presence/absence information of each solid when presence and absence of the element are allocated to the entire solids. For a solid allocated with information indicative of presence of the element, the model creating unit 13d determines that the element exists in the entire solid, and for a solid allocated with information indicative of absence of the element, the model creating unit 13d determines that the element does not exist in the entire solid. The model creating unit 13d then creates an analytical model and stores the created analytical model in the analytical model storage unit 14b.

A process that allocates the presence/absence information indicative of whether the element exists in the solid to each solid will then be described in detail with reference to FIG. 8. Specifically, the model creating unit 13d determines that the number of the inclusion-ratio determination-points at the position included in the element is "5" and that is equal to or more than the predetermined threshold of "5", and the model creating unit 13d then allocates information indicative of presence of the element to the solid (see FIG. 8A). The model creating unit 13d determines that the number of the inclusion-ratio determination-points at the position included in the element is "4" and that is less than the predetermined threshold of "5", and the model creating unit 13d allocates information indicative of absence of the element to the solid.

The analyzing unit 13e analyzes a subject for analysis using an analytical model. Specifically, the analyzing unit 13e reads the analytical model stored in the analytical model storage unit 14b and analyzes a subject for analysis using the read analytical model (e.g., structural analysis, fluid analysis, and electromagnetic wave analysis).

Figure 9:
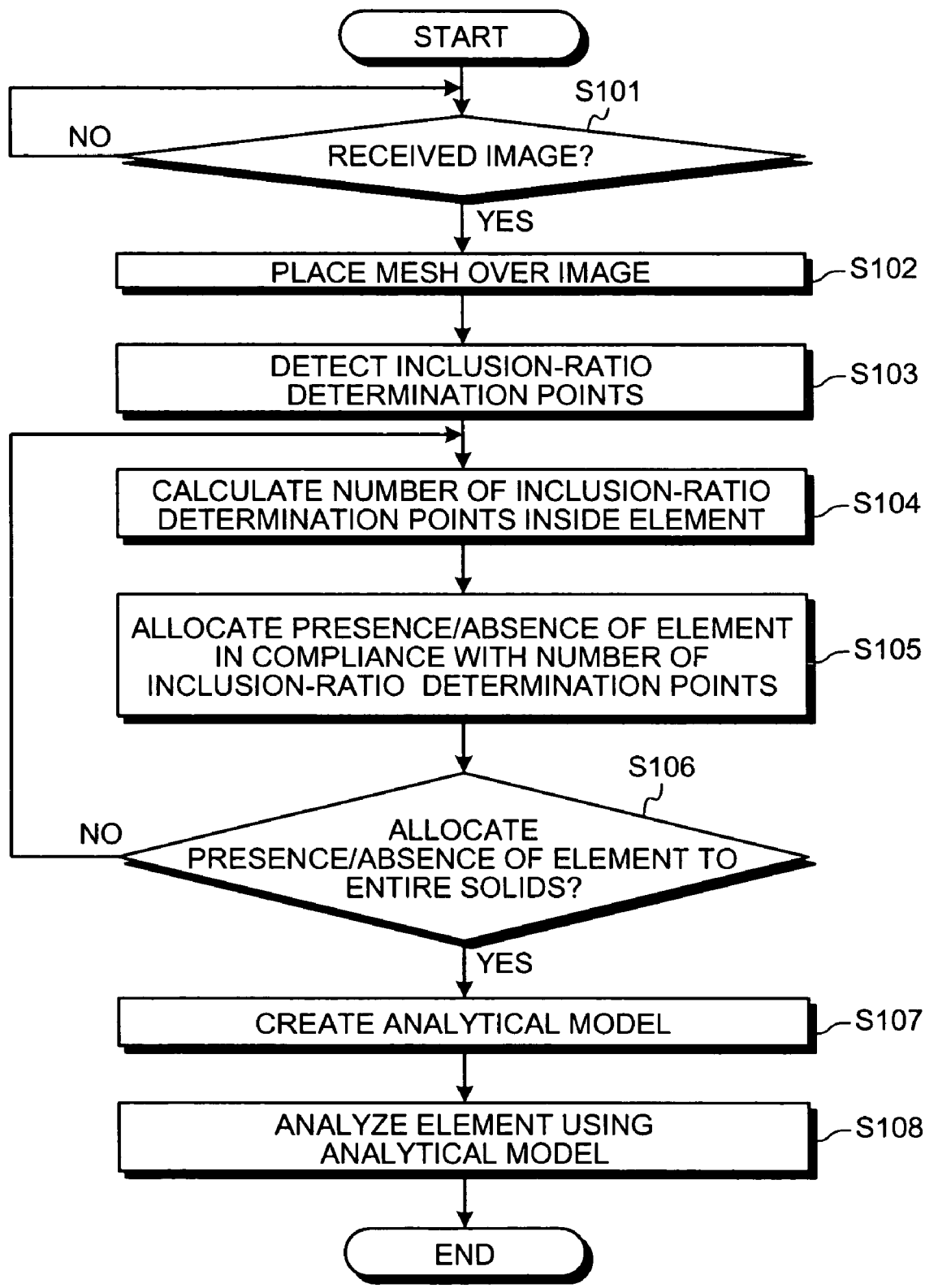
FIG. 9 is a flowchart of an analyzing process according to the first embodiment.

FIG. 9 is a flowchart of a process performed by the analyzing apparatus 10. As shown in FIG. 9, when the input unit 11 receives input of an image of an element (step S101), the mesh placing unit 13a places a mesh over the image and stores the image placed with the mesh in the mesh-placed image storage unit 14a (step S102). The inclusion-ratio determination-point detecting unit 13b reads the image information stored in the mesh-placed image storage unit 14a and applies straight lines to divide the image into solids to detect inclusion-ratio determination-points where the straight lines and the mesh intersect (step S103).

The inclusion-ratio determination-point calculating unit 13c then determines whether the inclusion-ratio determination-points detected by the inclusion-ratio determination-point detecting unit 13b are at the position included in the element and calculates the numbers of the inclusion-ratio determination-points at the position included in the element (step S104).

For each of solids, the model creating unit 13d determines whether the number of the inclusion-ratio determination-points is equal to or more than a predetermined threshold (step S105). The model creating unit 13d then allocates information indicative of presence of the element to the solids determined to have numbers of the inclusion-ratio determination-points equal to or more than the predetermined threshold, and allocates information indicative of absence of the element to the solids determined to have numbers of the inclusion-ratio determination-points less than the predetermined threshold.

The model creating unit 13d then determines whether the model creating unit 13d has allocated the presence/absence information to the entire solids (step S106). When the model creating unit 13d has not allocated presence and absence of the element to the entire solids (No at step S106), the model creating unit 13d returns to the above process to calculate the inclusion-ratio determination-points and repeats the process allocating the presence/absence information to the solids (steps S104 and S105).

When the model creating unit 13d has allocated presence and absence of the element to the entire solids, (Yes at step S106), the model creating unit creates an analytical model based on the presence/absence information of the solids (step S107).

For a solid allocated with information indicative of presence of the element, the model creating unit 13d determines that the element exists in the entire solid, and for a solid allocated with information indicative of absence of the element, the model creating unit 13d determines that the element does not exist in the entire solid. The model creating unit 13d then creates an analytical model and stores the created analytical model in the analytical model storage unit 14b.

The analyzing unit 13e then reads the analytical model stored in the analytical model storage unit 14b and analyzes the subject for analysis using the read analytical model.

As described above, the analyzing apparatus 10 determines the number of the inclusion-ratio determination-points in each solid. Determination of the number of the inclusion-ratio determination-points in each solid is faster and easier that calculating the area or the volume of the element.

Although an embodiment of the present invention has been described, other than the embodiment, the present invention may be implemented in various other embodiments. Another embodiment included in the present invention will now be described as a second embodiment.

(1) Plural Step Determination

For the solids with numbers of the inclusion-ratio determination points around the predetermined value, the present invention may be configured to reapply straight lines dividing the solids equally and more minutely to detect the inclusion-ratio determination-points again.

Specifically, as in the first embodiment, the analyzing apparatus 10 of the second embodiment calculates numbers of the inclusion-ratio determination-points (e.g., number of points "4") at the position included in the element, and then determines whether the calculated numbers of the inclusion-ratio determination-points are around the predetermined threshold (e.g., when the predetermined threshold is "5", values around the threshold are "4" to "6") as shown in FIG. 10.

When the calculated number of the inclusion-ratio determination-points is around the predetermined threshold (e.g., values of "4" to "6" when the predetermined threshold is "5"), the analyzing apparatus 10 reapplies straight lines dividing the solids equally and more minutely and detects again the inclusion-ratio determination-points where the straight lines and the mesh intercross. In the example of FIG. 10, the analyzing apparatus 10 applies straight lines dividing the solids into 16 and detects 25 inclusion-ratio determination-points where the straight lines and the mesh intercross.

For the solids having the inclusion-ratio determination-points detected again, the analyzing apparatus 10 determines whether the detected inclusion-ratio determination-points are at the position included in the element and recalculates the numbers of the inclusion-ratio determination-points at the position included in the element. For example, describing specifically using the example of FIG. 10, the analyzing apparatus 10 calculates that the number of the inclusion-ratio determination-points at the position included in the element is "14". Since the number of the entire inclusion-ratio determination-points is "25" and the number of the inclusion-ratio determination-points at the position included in the element is "14", the ratio (inclusion ratio) of the element in the solid is 14/25=56%.

For the solids having the recalculated numbers of the inclusion-ratio determination-points, the analyzing apparatus 10 again determines whether the calculated numbers of the inclusion-ratio determination-points are more than the predetermined threshold, and allocates information indicative of presence of the element when the numbers of the inclusion-ratio determination-points are equal to or more than the predetermined threshold and allocates information indicative of absence of the element when the numbers of the inclusion-ratio determination-points are less than the predetermined threshold. In the example of FIG. 10, the analyzing apparatus 10 determines that the calculated number of inclusion-ratio determination-points is "14" and that the predetermined threshold is "13". The analyzing apparatus 10 then allocates information indicative of presence of the element to the solid and creates the analytical model. The analyzing apparatus 10 then analyzes the subject using the analytical model.

For the solids having the calculated numbers of the inclusion-ratio determination-points around the predetermined threshold, the analyzing apparatus 10 reapplies straight lines dividing the solids equally and more minutely and detects again the inclusion-ratio determination-points where the straight lines and the mesh intercross. For the solids having inclusion-ratio determination-points detected again, the analyzing apparatus 10 determines whether the detected inclusion-ratio determination-points are at the position included in the element and recalculates the numbers of the inclusion-ratio determination-points at the position included in the element. For the solids with recalculated numbers of the inclusion-ratio determination-points, the analyzing apparatus 10 determines whether the recalculated numbers of the inclusion-ratio determination-points are more than the predetermined threshold. The analyzing apparatus 10 allocates information indicative of presence of the element when the numbers of the inclusion-ratio determination-points are equal to or more than the predetermined threshold and allocates information indicative of absence of the element when the numbers of the inclusion-ratio determination-points are less than the predetermined threshold. Therefore, the analyzing apparatus 10 can accurately allocate presence/absence information indicative of whether the element exists in the solids. For the solids having numbers of inclusion-ratio determination-points around the predetermined threshold, the analyzing apparatus 10 divides the solids more minutely to increase the inclusion-ratio determination-points and more accurately measures the inclusion ratio of the element.

(2) System Configuration, Etc.

The constituent elements of the devices in the drawings are functional and conceptual and do not have to be physically configured as illustrated. Specific configurations of distribution and integration of the devices are not limited to the configurations in the drawings, and all or some of the configurations can be configured by functionally or physically distributing and integrating in arbitrary forms in compliance with various loads, usage status, etc. For example, the mesh placing unit 13a and the inclusion-ratio determination-points detecting unit 13b can be integrated. All or an arbitrary part of the processing functions conducted by the devices can be realized by a CPU or by a program analyzed and executed by the CPU, or can be realized as hardware with wired logic.

The information including processing procedures, controlling procedures, specific names, various data, and parameters illustrated in the document and the drawings (e.g., information indicating how many the solids will be divided into) can be arbitrarily changed unless otherwise stated.

Figure 11:
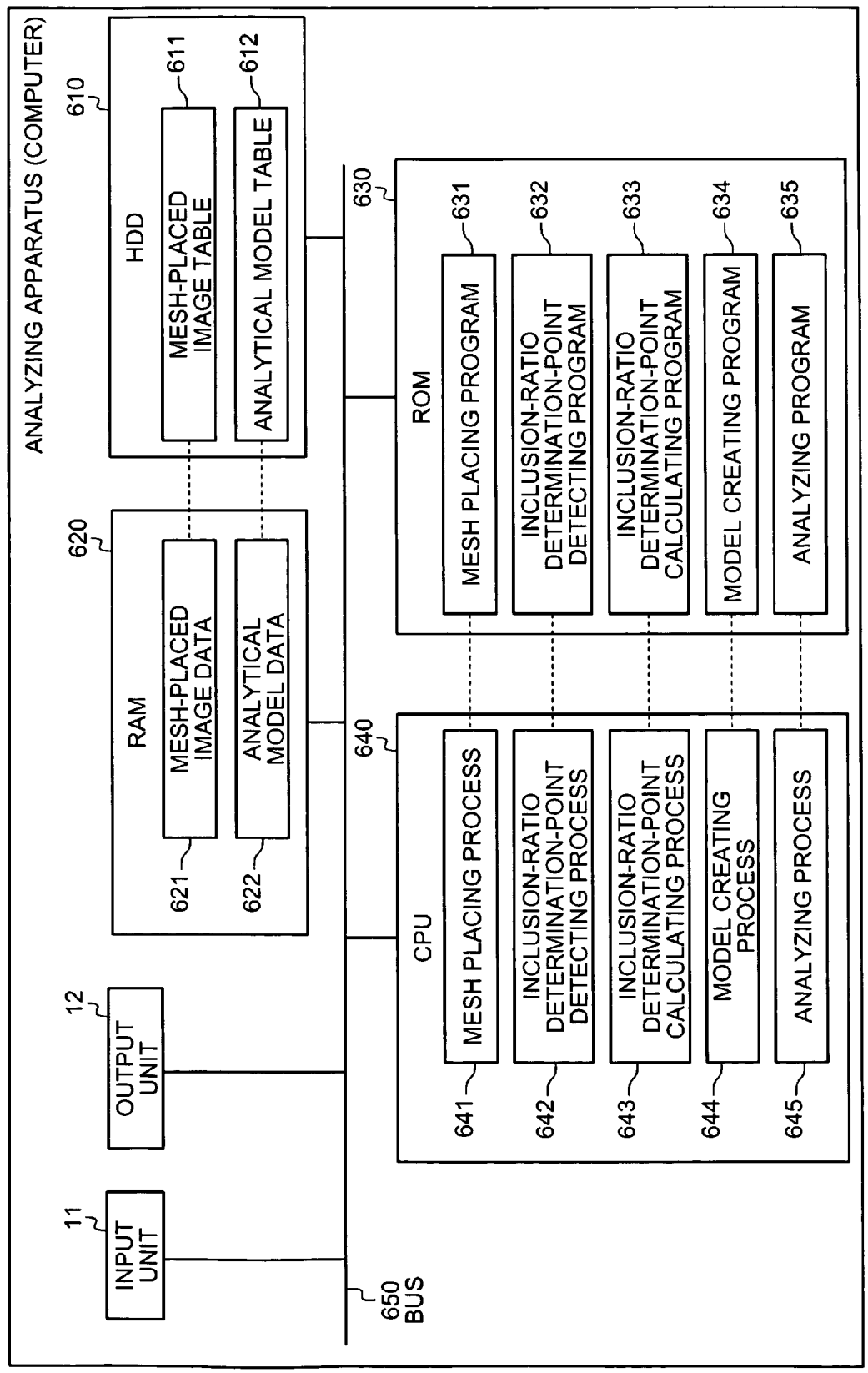
FIG. 11 depicts a computer that realizes the analyzing apparatuses according to the first and second embodiments.

The various processes described in the embodiments can be realized by executing prepared programs with a computer. One example of a computer that executes programs having similar functions as those of the embodiments will now be described. FIG. 11 depicts a computer that executes an analyzing apparatus.

As shown in FIG. 11, a computer 600 as an analyzing apparatus consists of an input unit 11, an output unit 12, an HDD 610, a RAM 620, a ROM 630, and a CPU 640 connected with a bus 650.

The ROM 630 preliminarily stores programs of the analyzing apparatus fulfilling the similar functions as those of the embodiments, i.e., a mesh placing program 631, an inclusion-ratio determination-point detecting program 632, an inclusion-ratio determination-point calculating program 633, a model creating program 634, and an analyzing program 635, as shown in FIG. 11. The programs 631 to 635 may be arbitrarily integrated and distributed, similar to the constituent elements of the analyzing apparatus of FIG. 11.

With the CPU 640 reading the programs 631 to 635 from the ROM 630 and executing the programs, the programs 631 to 635 function as a mesh placing process 641, an inclusion-ratio determination-point detecting process 642, an inclusion-ratio calculating process 643, a model creating process 644, and an analyzing process 645, as shown in FIG. 11. The processes 641 to 645 correspond respectively to the mesh placing unit 13a, the inclusion-ratio determination point detecting unit 13b, an inclusion-ratio determination-point calculating unit 13c, a model creating unit 13d, and the analyzing unit 13e, illustrated in FIG. 2.

As shown in FIG. 11, the HDD 610 provides a mesh placed image table 611 and an analytical model table 612. The mesh placed image table 611 and the analytical model table 612 correspond to the mesh-placed image storage unit 14a and the analytical model storage unit 14b. The CPU 640 registers data to the mesh placed image table 611 and the analytical model table 612. The CPU 640 then reads mesh placed image data 621 and analytical model data 622 from the mesh placed image table 611 and the analytical model table 612, and stores the data in the RAM 620. The CPU 640 then conducts a process based on the mesh placed image data 621 and the analytical model data 622 stored in the RAM 620.

Thus, according to an aspect of the present invention, it is possible to easily, speedily, and accurately create an analytical model of an element.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An analyzing apparatus comprising:
   a placing unit that places a mesh over an image of the element thereby dividing the image into a plurality of solids;
   a dividing unit that divides with straight lines each of the solids into an even number of parts, each part having substantially same area;
   a determining unit that for each of the solids determines intersection points that are points where the straight lines in the solid intersect with a boundary of the element in the image;
   a calculating unit that determines for each of the solids whether the intersection points determined by the determining unit are inside or outside of the element, and calculates a number of inside intersection points that are intersection points inside of the element; and
   a model creating unit that
      determines for each of the solids whether the number of the inside intersection points calculated by the calculating unit is equal to or more than a first threshold,
      allocates information indicative of presence of the element in a solid determined to have the number of the inside intersection points equal to or more than the first threshold,
      allocates information indicative of absence of the element in a solid determined to have the number of the inside intersection points less than the first threshold, and
      creates an analytical model for the element from the information allocated to the solids.

2. The analytical apparatus of claim 1, wherein, if for a solid the number of the inside intersection points is around the first threshold, for that solid
   the dividing unit divides the solid into more number of parts,
   the determining unit determines intersection points for that solid, the calculating unit determines whether the intersection points are inside or outside of the element, and calculates a number of inside intersection points that are intersection points inside of the element, and the model creating unit
   determines whether the number of the inside intersection points is equal to or more than a second threshold,
   allocates information indicative of presence of the element in the solid if the number of the inside intersection points is equal to or more than the second threshold, and
   allocates information indicative of absence of the element in the solid if the number of the inside intersection points is less than the second threshold.

3. A method of creating an analytical model for analyzing an element, comprising:
   placing a mesh over an image of the element thereby dividing the image into a plurality of solids;
   dividing with straight lines each of the solids into an even number of parts, each part having substantially same area;
   determining, for each of the solids, intersection points that are points where the straight lines in the solid intersect with a boundary of the element in the image;
   determining, for each of the solids, whether the intersection points are inside or outside of the element, and calculating a number of inside intersection points that are intersection points inside of the element;
   determining, for each of the solids, whether the number of the inside intersection points is equal to or more than a first threshold;
   allocating information indicative of presence of the element in a solid determined to have the number of the inside intersection points equal to or more than the first threshold;
   allocating information indicative of absence of the element in a solid determined to have the number of the inside intersection points less than the first threshold; and
   creating an analytical model for the element from the information allocated to the solids.

4. A computer-readable recording medium that stores therein a computer program that causes a computer to implement a method of creating an analytical model for analyzing an element, the computer program causing the computer to execute:
   placing a mesh over an image of the element thereby dividing the image into a plurality of solids;
   dividing with straight lines each of the solids into an even number of parts, each part having substantially same area;
   determining, for each of the solids, intersection points that are points where the straight lines in the solid intersect with a boundary of the element in the image;
   determining, for each of the solids, whether the intersection points are inside or outside of the element, and calculating a number of inside intersection points that are intersection points inside of the element;
   determining, for each of the solids, whether the number of the inside intersection points is equal to or more than a first threshold;
   allocating information indicative of presence of the element in a solid determined to have the number of the inside intersection points equal to or more than the first threshold;

allocating information indicative of absence of the element in a solid determined to have the number of the inside intersection points less than the first threshold; and creating an analytical model for the element from the information allocated to the solids.

* * * * *